2,923,640

METHOD OF APPLYING A PLASTIC COATING

William T. Buckingham, Galena, Ohio, assignor, by mesne assignments, to The Griscom-Russell Company, Massillon, Ohio, a corporation of Delaware No Drawing. Application March 29, 1956
Serial No. 574,631

3 Claims. (Cl. 117—49)

This invention relates to a method whereby a high-molecular-weight plastic-resin-type compound is applied to a metal surface to form an extremely thin, adherent, liquid-repellent coating. The coatings obtained by the method of the present invention are particularly adaptable for use as dropwise promoting coatings in heat-transfer devices.

In a common form of heat exchanger, vapor is condensed on one surface of a separating wall and heat is conducted on this surface through the wall to the opposite surface that is cooled, whereby heat is lost on the vapor side of the wall and is gained on the other side. It is well known that when vapor condenses as drops on a surface, the rate of heat transfer is greater than when the condensing vapor forms a film on the surface. It is also well known that filmwise condensation takes place on a truly clean metal surface, and that dropwise condensation takes place if the surface of the metal is even slightly contaminated by material that is not wet by the condensed vapor.

Dropwise condensation has conventionally been created on condenser surfaces by providing the condensing surface with an extremely thin film, preferably a monomolecular film of a liquid-repellent organic material such as wax or, more commonly, compounds containing polar groups which increase the adherence of the material to the metal surface. These materials are usually referred to as promoters. Thinness of the films or coatings is of great importance in that if the films are too thick, they will cut down on the heat-transfer properties of the condenser wall.

A monomolecular layer of such a promoter does not last indefinitely in the presence of steam or vapors, or other polar compounds. In a closed system, it is customary to maintain a monomolecular layer of polar promoter materials by continuously or periodically injecting an excess of the promoter material into the vapor, or by adding the promoter to the liquid before it is evaporated. Common nonpolar compounds, such as paraffin hydrocarbons, do not cling tenaciously to the surface of the metal and have been considered to be unsuitable for promoting dropwise condensation for any substantial length of time. In addition, the common nonpolar compounds are dissolved by many nonpolar liquids and thus are not suitable for promoting dropwise condensation of these liquids.

Copending patent application Serial No. 560,194 discloses a continuous high-molecular-weight plastic-resin-type compound film which has proven to satisfactorily promote dropwise condensation on a condenser surface for an indefinite period of time.

It is extremely important that these solid plastic coatings be very thin, preferably within a thickness range of from about 2 molecules to about 0.00001 inch to avoid interference with the heat conductivity of the condenser wall. Prior art methods of coating, such as brushing, dipping, and ordinary spraying cannot be controlled to provide the necessary thin and even coat required to provide dropwise condensation on condenser surface without interfering with heat conductivity.

It has now been found that extremely thin water- or liquid-repellent resin coatings which are substantially even in thickness may be effectively provided to a condenser surface.

In general, the present invention relates to a method of obtaining a thin, high-molecular-weight plastic-resin-type film by spraying an object with a water emulsion of an organic resinous material preferably while rotating the object rapidly. The present method is particularly applicable to providing a plastic coating of from 2 molecules to 0.00001 inch effective thickness to condenser tubes by spraying the surface of said condenser tubes with a water emulsion containing an organic resinous material while rotating the tubes. Suitable plastic resinous materials for such application have been found to be materials having an average molecular weight of at least about 10,000. Suitable materials are the polyfluoroethylenes, such as polytetrafluoroethylene and polymonochlorotrifluoroethylene, polychloroethylenes, polychlorofluoroethylenes, polyethylenes, polystyrenes, copolymers of the foregoing materials, and high-molecular-weight metal-organic compounds. After coating, the organic resinous materials may be cured to form an insoluble durable coating. Curing of some of the abovementioned polymers may be effected by heating the coating to a temperature of from about 400° F. to about 750° F. for a time of from about 60 minutes to about 1 minute.

It is, therefore, the object of this invention to provide a method of applying a thin coating of high-molecular-weight plastic-resin-type compound to a metal surface.

It is also an object of this invention to produce a film sufficiently thin so as not to substantially diminish the heat-transfer qualities of the surface which it covers.

A further object of this invention is to provide a method of applying an even, high-molecular-weight plastic-resin-type film to a condenser surface that will increase the heat-transfer properties of the condenser wall by promoting dropwise condensation.

Other objects and advantageous features will be obvious from the specification.

To produce a surface film of the aforementioned type on a condenser surface so as to provide dropwise condensation, the surface must be thoroughly cleaned. This may be done by first degreasing the condensing surface with a substance such as trichloroethylene. The condensing surface is next brushed with an abrasive alkaline cleaner, preferably of the nonphosphate type, to remove tightly adhering dirt. This leaves the tube in a fairly clean condition. However, there still may remain some oxide and mill scale resulting from processing. This can be removed by grinding until a polished surface results. A grit size of 180 to 220 will remove all oxides and give the surface sufficient roughness to provide a satisfactory surface for coating with a resinous film. Immediately prior to the spraying operation, the freshly ground surface of the tube is cleaned with a solution of trichloroethylene to remove any last traces of oil and organic materials which would prevent proper adherence of the plastic resin.

The present process of coating is particularly adaptable to a method of coating condenser tubes, since tubes may be rotated while spraying to effect a uniform centrifugal force about the outside surface. The optimum speed of rotation depends upon the thickness of the film desired, the rate of spray, and the concentration of resinous material in the spray solution. To effect uniformly thick films as required to provide coatings approximately 0.00001-inch thick, the tubes are rotated at a speed of at least about 200 r.p.m. For most purposes a speed of 400 r.p.m. is preferred, and speeds as high as 1600 r.p.m. may be employed.

For application of the resinous film to condenser tubes, a solution may be prepared by emulsifying the high-molecular-weight resin in water. The concentration of resinous material is preferably from 5 to 15 percent by weight. However, it is possible to use a plastic-resin solution containing as little as 1/10 percent or as much as 40 percent by weight, of the resin. It is also preferable to add a small amount of an etchant, such as chromic acid, to the solution in order to etch the walls of the condenser tubes while depositing the plastic coating. Spray emulsions which contain the greater amount of solids, must be sprayed faster than the dilute solutions since they tend to cover or produce thicker films more rapidly. With the very dilute solutions, a more uniform film thickness is obtained since more time can be devoted to the spraying operation.

The solution may be sprayed from a commercial-type gun under pressure. During spraying 1/2-inch diameter to 1-inch diameter condenser tube preferably are rotated on their horizontal axes at a speed of at least 200 r.p.m. and sprayed by moving the gun along the horizontal length of the tube at a uniform rate so that a smooth unbroken film results. For larger or smaller diameter tubes and objects the preferred minimum rate of rotation is that required to achieve an equivalent linear velocity to the speed of 1/2-inch to 1-inch tubes rotating at about 200 r.p.m. or approximately 300 inches per minute linear velocity at the sprayed surface. Thus, the surface area of larger and smaller tubes and objects must be moving at least as fast as the sprayed surface of 1/2-inch to 1-inch tubes at 200 r.p.m. The tube may be allowed to rotate at lower speeds until completely dry. At this point it is advantageous to use an oxygen-gas flame to fuse the plastic coating to the tube. Fusion may be accomplished by holding the flame approximately 6 inches from the tube in such a manner that the actual fusion can be observed visually. As the film fuses to the tube the coating changes in color and in physical appearance. The flame is kept behind the advancing line of demarcation which separates the fused from the unfused portion, and moved as fast as necessary to permit proper fusion of the film. If the flame is held too long at one point, overfusion results in ruining the film. Following fusion, the tube may be polished while still warm by rotating at higher speeds and holding a flannel cloth or similar material to remove a powdery product formed in the direct fusion process. The tube may be cooled rapidly after the final polishing operation, by quenching either in water or in air.

Drying time of the sprayed coating varies with the nature of the sprayed dispersion. A thin coat containing less solid material and more of the other agents, requires more time than the concentrated dispersions. The drying period can be shortened considerably by the use of an infrared or similar type of dryer. Best results with the 5-15 percent dispersion are obtained with a 20-to-30 minute air drying period following an application. Depending upon drying conditions and the use of external dryers, drying could be anywhere from 1 to 30 minutes. Temperatures of an external dryer should not exceed 180 to 200° F. The dried coating may be fused at any temperature from about 400 to 750° F. Lower temperatures, however, result in much softer coatings and true fusion does not take place much below 675° F. At the lower temperatures of 400 to 475° F., fusion may take as much as 1 hour whereas between 675 to 750° F. fusion time may be reduced to a matter of minutes. Factors other than time and temperatures, such as wall thickness of the metal being coated, also affect the fushion of the film. Depending upon temperature and metal thickness, fusion time may be anywhere from 1 to 60 minutes. The recommended fusion temperatures and time for a thin polytetrafluoroethylene film on copper would be 690° F. for 1 to 2 minutes. Fusion may be accomplished by conventional means such as (1) heating with infrared lamps; (2) forced air or convection ovens; (3) direct flame fusion; (4) electrical resistance; and (5) induction heating. In direct flame-heating fusion, the operator must judge when the fusion has taken place and advance the flame accordingly.

The liquid-repellent polymer employed to form the dropwise promoting film preferably is a high polymeric material that may be nonpolar. The liquid-repellent polymer of the film has a high average molecular weight, preferably at least about 10,000. Most polymeric materials and many other materials usually denoted as single substances contain molecules of different weights. As used here, "molecular weight" means the arithmetic average of the weights of all of the molecules, that is the weight of the material in grams divided by the number of moles in the material.

The process of this invention may be illustrated by the following examples without, however, being limited to them.

*Example I*

A 3-foot section of 3/4-inch copper condenser tube with 20 gage wall was coated with a 1:5 aqueous dispersion of Teflon. The Teflon was Du Pont's one coat enamel No. 851-204 containing 48 percent by weight of polytetrafluoroethylene in aqueous dispersion. The tube was prepared for coating by light grinding through a series of abrasives, buffing to a bright-mirror finish, cleaning by vapor degreasing and electrolysis in hot alkaline cleaner at 200° F., 50 ASF, 5 volts for 1 minute, rinsing, and drying with a clean cloth. The tube was rotated at approximately 800 r.p.m. and the coating was applied by spraying from a distance of approximately 36 inches. The spray was applied under 50 p.s.i. pressure and was very light. Fusion was carried out at 690° F. for 1.5 minutes under forced air circulation. The coating and tube were allowed to air cool with no quench. The coating was uniform, medium brown in color, had excellent adhesion and provided excellent droplet formation. Heat transfer was far superior to that of uncoated tubes of similar size.

*Example II*

Several 13-foot long, 5/8-inch diameter, 90-10 copper-nickel, condenser tubes were coated with a 1:9 one-coat enamel No. 851-204 (48 percent, by weight, polytetrafluoroethylene) aqueous dispersion of Teflon. The tubes were first cleaned with a solution of trichloroethylene to remove grease and oil, and then were polished with 180-grit abrasive while rotating the tube at 400 r.p.m. in a tube lathe. The surface was again cleaned with trichloroethylene solution to remove final traces of dirt and oil. The tubes were sprayed with the aqueous dispersion of Teflon using a commercial-type spray gun and a pressure of 50 p.s.i. The spray coating was applied at a distance of approximately 8 inches while moving the gun horizontally along the entire length of the tube. The coating thickness was determined by the color of the Teflon film as it was laid down upon the surface. The tube was rotated until the coating was completely dry. Fusion was accomplished with an oxygen-gas flame held approximately 6 inches from the tube surface and moving along as fast as fusion would permit. The tube was rotated at 400 r.p.m. during fusion, and fusion was judged to be complete by a change from a green satin texture to a light-brown glossy appearance. When fusion was complete the tube was polished immediately with a flannel cloth to remove a film resulting from the direct flame fusion. The tube was cooled rapidly by forcing cold compressed air through the center of the tube. The tubes produced in this manner were very uniform and provided dropwise condensation over their entire length.

What is claimed is:

1. A method of providing a dropwise condensation promoting adherent film having a thickness from about 2 molecules to 0.00001 inch on the outer surface of a metal tube comprising: spraying said surface with a water emulsion containing from about 5 to 15 percent by weight of a material selected from the group consisting of polyfluoroethylenes, polychloroethylenes, polychlorofluoroethylenes, polyethylenes, and polystyrenes, while rotating said tube about its axis at a speed providing a circumferential linear velocity of at least about 300 inches per minute; and fusing the resulting coating at a temperature of about 400 to 750° F. for about 1 hour to 1 minute.

2. A method of providing a dropwise condensation promoting adherent film having a thickness from about 2 molecules to 0.00001 inch on a metal tube comprising: cleaning the outer surface of said tube with a solution of trichloroethylene; polishing said surface; cleaning said surface again with a solution of trichloroethylene; spraying said surface with a water emulsion containing from about 5 to 15 percent by weight of a material selected from the group consisting of polyfluoroethylenes, polychloroethylenes, polychlorofluoroethylenes, polyethylenes, and polystyrenes, while rotating said tube about its axis at a speed providing a circumferential linear velocity of at least about 300 inches per minute; drying the resulting coating; fusing said coating at a temperature of about 400 to 750° F. for about 1 hour to 1 minute; polishing said coating; and quenching the coated surface.

3. A method of providing a dropwise condensation promoting film having a thickness of from 2 molecules to 0.00001 inch on a metal tube comprising cleaning the outer surface of the tube with a solution of trichloroethylene, brushing the surface with an abrasive alkaline cleaner, polishing the surface, cleaning the polished surface with a solution of trichloroethylene, rotating the tube about its axis at a speed providing a circumferential linear velocity of at least about 300 inches per minute, spraying the polished and cleaned surface of the rotating tube with a water emulsion containing from about 5 to 15 percent by weight of a material selected from the group consisting of polyfluoroethylenes, polychloroethylenes, polychlorofluoroethylenes, polyethylenes, and polystyrenes, by moving the spray uniformly longitudinally of the rotating tube to form a film of from 2 molecules to 0.00001 inch thickness on the surface of the tube, then rotating the coated tube at a slower speed at a temperature of not over 200° F. until the film is dry, then fusing the dried film at a temperature of about 400° to 750° F., polishing the still warm fused film while rotating the tube at high speed, and then quenching the coated surface.

References Cited in the file of this patent

UNITED STATES PATENTS

| | | |
|---|---|---|
| 2,348,714 | Defiore | May 16, 1944 |
| 2,428,364 | Frager | Oct. 7, 1947 |
| 2,469,729 | Hunter | May 10, 1949 |
| 2,562,118 | Osdal | July 24, 1951 |
| 2,636,767 | Green | Aug. 17, 1954 |
| 2,737,461 | Heisler et al. | Mar. 6, 1956 |
| 2,817,562 | Fleming et al. | Dec. 24, 1957 |